H. D. JAMES.
CONTROL SYSTEM FOR ELECTRIC MOTORS.
APPLICATION FILED SEPT. 26, 1910.
1,024,631.
Patented Apr. 30, 1912.
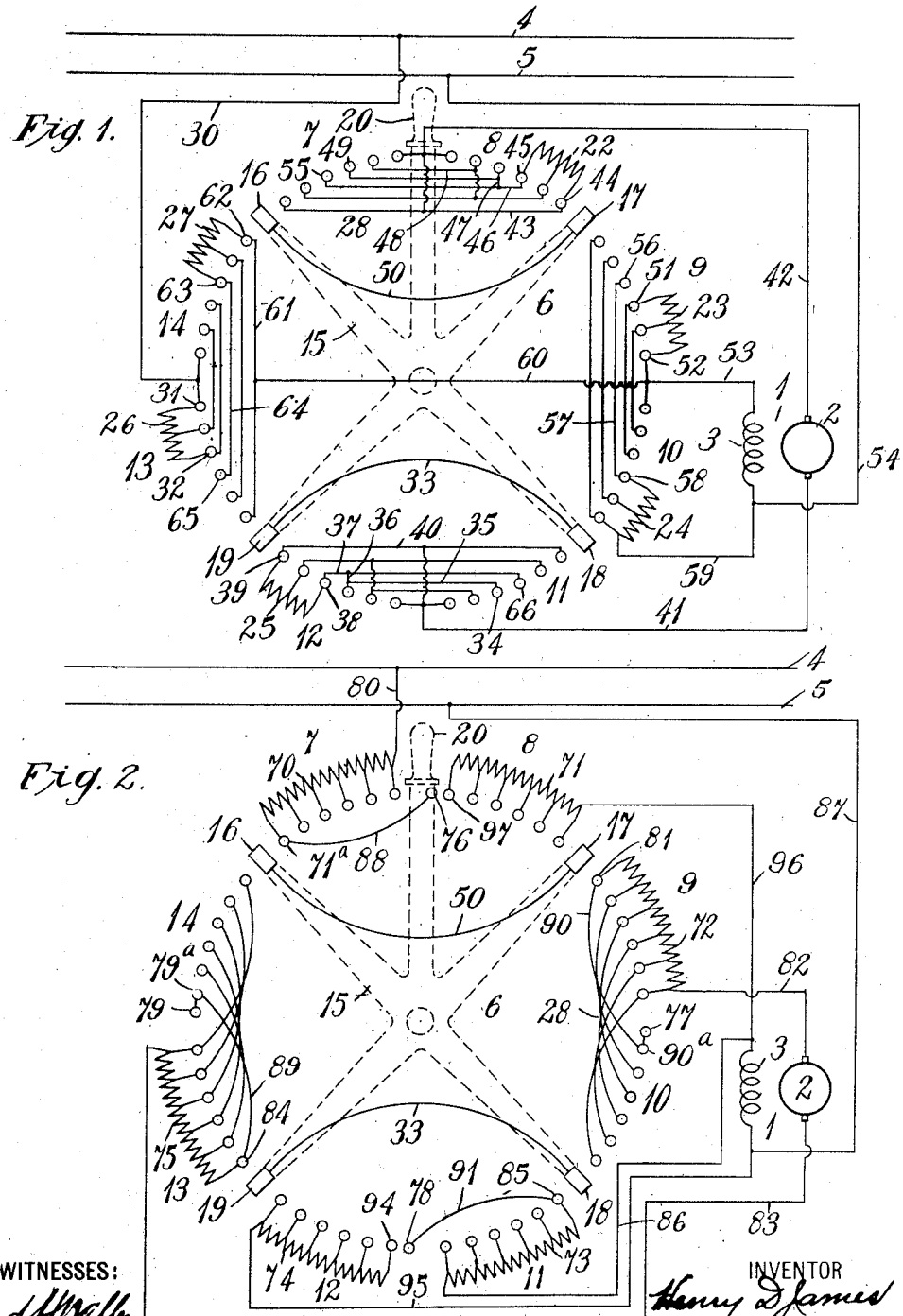

UNITED STATES PATENT OFFICE.

HENRY D. JAMES, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR ELECTRIC MOTORS.

1,024,631. Specification of Letters Patent. Patented Apr. 30, 1912.

Application filed September 26, 1910. Serial No. 583,861.

*To all whom it may concern:*

Be it known that I, HENRY D. JAMES, a citizen of the United States, and a resident of Pittsburgh, in the county of Allegheny and State of Pennsylvania, have invented a new and useful Improvement in Control Systems for Electric Motors, of which the following is a specification.

My invention relates to systems of control for electric motors and more particularly to such motors as are adapted for use with electrically operated traveling cranes.

The object of my invention is to provide a control system of the class above indicated which shall be extremely simple in arrangement, in order to facilitate effective and efficient operation of cranes under actual operating conditions.

In the accompanying drawings, Figure 1 is a diagrammatic view of a system of control which embodies my invention, and Fig. 2 is a similar view of a modification of the system shown in Fig. 1.

Referring to Fig. 1 of the accompanying drawings, an electric motor 1, having an armature 2 and a field magnet winding 3, is connected to a supply circuit 4—5 by means of a controller 6. The controller 6 is of the usual grind stone type and is provided with a plurality of groups of stationary contact terminals 7, 8, 9, 10, 11, 12, 13 and 14 which are circumferentially disposed, and with a multi-armed rotatable bracket member 15, having a plurality of movable contact members 16, 17, 18 and 19 mounted thereon and electrically connected in pairs. The rotatable bracket 15 is also provided with an operating handle 20, by means of which the movable contact members 16 to 19, inclusive, are moved into and out of engagement with the several groups of stationary contact terminals 7 to 14, inclusive.

The groups of stationary contact terminals 8, 9, 10, 12, 13 and 14 are provided with sub-divided sections of resistances 22, 23, 24, 25, 26 and 27 and correspondingly located contact terminals of each alternate pair of groups are electrically connected together by cross connecting conductors 28.

The system of control shown in Fig. 1 is particularly adapted for the longitudinal and transverse operation of electric cranes and it is specially arranged to establish connections for motor operation and dynamic braking in both directions, as will be hereinafter set forth.

Assuming the various connections and parts to occupy the positions shown in Fig. 1, the mode of operation and the circuit connections are as follows:

If the operating handle 20 be rotated in a clockwise direction, so that the movable contact members 16, 17, 18 and 19 come into engagement with any of the first three contact terminals of the groups 7, 9, 11 and 13, no operative connections are established, as the positive supply line 4 is not connected to the controller circuits and the motor armature 2 is at rest. However, as the movable contact members 16 to 19, inclusive, are moved into engagement with the fourth contact terminals of the several groups 7, 9, 11 and 13, a circuit is completed from the positive supply circuit conductor 4, through conductor 30, contact terminal 31, resistance 26, contact terminal 32, movable contact member 19, conductor 33, movable contact member 18, contact terminal 34, conductor 35, conductor 36, conductor 37, contact terminal 38, resistance 25, contact terminal 39, conductor 40, conductor 41, armature 2, conductor 42, conductor 43, contact terminal 44, resistance 22, contact terminal 45, conductor 46, conductor 47, conductor 48, contact terminal 49, movable contact member 16, conductor 50, movable contact member 17, contact terminal 51, resistance 23, contact terminal 52, conductor 53, field magnet winding 3 and conductor 54, to the negative supply conductor 5. The circuit thus established causes the motor 1 to be operated at slow speed in one direction, the full amount of resistance being in circuit, and, as the operating handle 20 is moved progressively to its extreme position, the resistance sections 26, 25, 22 and 23 are gradually eliminated from the circuit, step-by-step, until the motor is operated at full speed upon the last notch of the controller, as will be readily understood.

If it is desired to decrease the speed of the motor 1, the operating handle 20 is moved in a counter-clockwise direction, thereby causing the movable contact members 16, 17, 18 and 19 to successively engage the last three contact terminals of the several groups in the reverse order, whereby the resistance sections 26, 25, 22 and 23 are cut into circuit, step-by-step. By thus moving the contact members 16 to 19, inclusive, into contact with the last three contact terminals of the groups 7, 9, 11 and 13, the speed of operation of the motor, in a particular direction, may be controlled, as desired, according to well known practice.

Assuming that the motor is running at any speed, and that it is desired to bring it to rest, the operating handle 20 is moved in a counter-clockwise direction, to cause engagement of the movable contact members 16 to 19, inclusive, with the third contact terminals of the respective groups, thus disconnecting the supply circuit conductor 4 and establishing a closed local circuit from one side of the armature 2, through the conductor 42, conductor 43, contact terminal 44, resistance 22, contact terminal 45, conductor 46, contact terminal 55, movable contact member 16, conductor 50, movable contact member 17, contact terminal 56, conductor 57, contact terminal 58, resistance 24, conductor 59, field magnet winding 3, conductor 53, conductor 60, conductor 61, contact terminal 62, resistance 27, contact terminal 63, conductor 64, contact terminal 65, movable contact member 19, conductor 33, movable contact member 18, contact terminal 66, conductor 37, contact terminal 38, resistance 25, contact terminal 39, conductor 40 and conductor 41, to the opposite side of the armature 2. The circuit thus completed constitutes a dynamic braking circuit which includes the full resistance of sections 22, 24, 27 and 25 which serve to absorb the energy delivered by the motor 1, which is now acting as a generator, by reason of its initial rotation. Hence, a braking action is effected, according to well known principles. As the movable contact members 16 to 19, inclusive, are successively caused to engage the first two contact terminals of the several groups, in the reverse order, the sections of resistance are eliminated from circuit step-by-step, until the dynamic braking action causes the motor to come to rest.

If the operating handle 20 be moved in a counter-clockwise direction to effect engagement of the movable contact members 16 to 19, inclusive, with the contact terminals of the groups 14, 12, 10 and 8, the motor connections are established for reverse operation. Otherwise, the mode of operation and the circuit connections are similar to those which have hereinbefore been described, and it is believed that those skilled in the art will experience no difficulty in understanding the operation and tracing the circuit connections.

Particular reference may now be had to Fig. 2, in which similar parts bear like reference numerals to those designated in Fig. 1. It will be observed that the general arrangement of parts is similar to that in the preceding figure, although certain modifications are embodied which particularly adapt the system for governing the circuit connections and operations of a motor used for hoisting and lowering purposes. A plurality of sub-divided resistance sections 70, 71, 72, 73, 74 and 75 are respectively connected to the groups of stationary contact terminals 7, 8, 9, 11, 12 and 13. The contact terminals of the group 9 are connected to the contact terminals of group 10, in reverse order, by means of cross-connecting conductors 28, and the contact terminals of group 13 are similarly cross connected to those of group 14. Furthermore, additional contact terminals 76, 77, 78 and 79 are respectively associated with the groups 8, 10, 12 and 14, and contact terminals 76 and 78 are respectively connected to the first contact terminals of groups 7 and 11, while the contact terminals 77 and 79 are respectively connected to the adjacent contact terminals of groups 10 and 14.

The operation and circuit connections of the system of control shown in Fig. 2 are as follows: To hoist, the operating handle 20 is moved in a clockwise direction to cause engagement of the movable contact members 16, 17, 18 and 19 with the first contact terminals of the groups 7, 9, 11 and 13, thereby establishing a circuit from the positive supply conductor 4, through conductor 80, resistance 70, contact terminal 71$^a$, movable contact member 16, conductor 50, movable contact member 17, contact terminal 81, resistance 72, conductor 82, motor armature 2, conductor 83, resistance 75, contact terminal 84, movable contact member 19, conductor 33, movable contact member 18, contact terminal 85, resistance 73, conductor 86, field magnet winding 3 and conductor 87, to the negative supply line 5. The motor 1 is thus connected in series with the full resistance sections enumerated and is arranged for hoisting at slow speed. As the movable contact members 16 to 19, inclusive, are successively moved into engagement with the remaining contact terminals of the groups 7, 9, 11 and 13, it is evident that the resistance sections 70, 72, 75 and 73 are gradually eliminated from the circuit step-by-step, thereby causing the motor to increase in speed. Those skilled in the art will readily understand that, as the operating handle is moved back to its neutral position, the resistances hereinbefore cited, are inserted, step-by-step, into the motor circuit, and corresponding decreases in motor speed are effected in accordance with well known principles. If it is desired to lower the load (not shown), the movable contact terminals 16 to 19, inclusive, are passed over the first six contact terminals of groups 14, 12, 10 and 8, which are electrically dead, and brought into contact with contact terminals, 79, 78, 77 and 76, thereby completing a circuit from the positive supply conductor 4, through conductor 80, resistance 70, contact terminal 71ᵃ, conductor 88, contact terminal 76, movable contact member 17, conductor 50, movable contact member 16, contact terminal 79, contact terminal 79ᵃ, conductor 89, contact terminal 84, resistance 75, conductor 83, motor armature 2, conductor 82, resistance 72, contact terminal 81, conductor 90, contact terminal 90ᵃ, contact terminal 77, movable contact member 18, conductor 33, movable contact member 19, contact terminal 78, conductor 91, contact terminal 85, resistance 73, conductor 86, field magnet winding 3, and conductor 87, to the negative supply conductor 5. It will be observed that a circuit is thus established through the full amount of resistance sections 70, 75, 72, and 73, and that, since the direction in which the current traverses the motor armature is reversed, a reversal of motor operation is effected to cause the initial downward movement of the load at slow speed. In order to control the action of the descending load, the movable contact members 16 to 19, inclusive, are moved, in clockwise direction, into engagement with the several contact terminals of the groups 14, 12, 10 and 8, thereby disconnecting the supply conductor 4 and establishing a local closed circuit from one side of the motor armature 2, through conductor 82, resistance 72, contact terminal 81, conductor 90, contact terminal 90ᵃ, movable contact member 18, conductor 33, movable contact member 19, contact terminal 94, resistance 74, conductor 95, field magnet winding 3, conductor 96, resistance 71, contact terminal 97, movable contact member 17, conductor 50, movable contact member 16, contact terminal 79ᵃ, conductor 89, contact terminal 84, resistance 75, and conductor 83, to the other side of the motor armature 2. By reason of the action of the downwardly falling load, the motor 1 is caused to operate as a generator to deliver energy to the resistances 72, 74, 71 and 75, whereby the speed of the motor is decreased, by reason of the dynamic braking action. As the movable contact members 16 to 19, inclusive, are successively moved, in a clockwise direction, into engagement with the contact terminals of the groups 14, 12, 10 and 8, it is evident that the resistances 72, 74, 71 and 75 are eliminated from the circuit, step-by-step, and, hence, the motor is gradually brought to rest.

While I have shown and described a specific arrangement of circuit connections and apparatus, I desire it to be understood that modifications which do not materially change the mode of operation and result are within the spirit and scope of my invention.

I claim as my invention:

1. In a control system, the combination with a source of energy, an electric motor and a plurality of resistance sections, of a controller comprising a plurality of circumferentially disposed sets of stationary contact terminals and a plurality of movable contact members to coöperate therewith, said controller being adapted, when operated in either direction, to connect said source of energy, said motor, and said resistances in series circuit and to cut out said resistances, step-by-step, and, when returned to its neutral position, to insert said resistances, step-by-step, establish a local closed circuit through said motor and said resistances, and cut out said resistances, step-by-step.

2. In a control system, an electric motor, a plurality of sections of resistance, and a controller to adjust the circuits of said motor and resistance, and adapted, when operated in either direction from its neutral position, to establish a series circuit through said motor and said resistance, and to successively eliminate said resistance from the circuit, and, when returned to its neutral position, to successively cut said resistance into circuit, establish a local closed circuit through said motor and said resistance and successively eliminate said resistance from circuit, operation on opposite sides of the neutral positions effecting connections for opposite directions of motor rotation.

3. In a control system, the combination with an electric motor, a plurality of sets of circumferentially disposed stationary contact terminals, a rocker member rotatable in either direction and having a plurality of contact members to coöperate with said sets of stationary contact terminals and electrically connected in pairs, and a plurality of resistance sections connected to said sets of contact terminals, of electrical connections associated with said stationary contact terminals and said motor, such that movement of said coöperating contact members in either direcon from the neutral position, establishes ineffective circuit connections on the first portion of said contact terminals, but establishes operative motor connections for speed control on the last portion of said contact terminals, while movement of said coöperating contact members toward the neutral position effects speed controlling motor connections on said last portion of contact terminals and establishes dynamic braking connections on said first portion of contact terminals.

4. In a control system, an electric motor and a controller therefor comprising a plurality of sets of stationary contact terminals disposed in an arc of a circle, a plurality of rigidly associated neutrally disposed movable contact members to coöperate with each adjacent set of contact terminals and a plurality of resistance sections associated with a portion of several sets of contact terminals, the arrangement of connections being such that the terminals of each set adjacent to the neutral positions are adapted for dynamic braking and the farthest removed terminals of each set for speed regulating motor operation.

5. In a control system, an electric motor, a plurality of resistance sections and a controller for said motor comprising relatively stationary and movable coöperating contact members, the arrangement of parts being such that accelerating motor connections for clockwise rotation are established by movement of said coöperating contact members in one direction from their neutral positions, and decelerating motor connections for clockwise rotation and regulating dynamic braking connections are successively established by movement to their neutral positions, while movement from their neutral positions in the opposite direction establishes similar motor connections for counter-clockwise rotation and the return movement to the neutral positions effects corresponding counter-clockwise motor connections and dynamic braking connections.

6. In a control system, the combination with an electric motor and six sectional resistances, of a controller comprising four groups of circularly disposed stationary contact terminals, correspondingly located terminals of each half group being electrically connected, and four rigidly associated rotatable contact members electrically connected in pairs to coöperate therewith.

7. A circuit controller comprising a plurality of groups of stationary contact terminals disposed in an arc of a circle, each group being divided into four sections, the outer sections being adapted for braking and the inner sections for motor operation, and a plurality of movable contact members neutrally disposed between said groups and adapted to be moved in either direction in successive engagement with said braking and said motor operating sections of contact terminals.

8. A circuit controller comprising a plurality of groups of circumferentially disposed stationary contact terminals, each group being divided into four sections, of which the outer sections are adapted for dynamic braking and the interposed sections for motor operation, correspondingly located terminals of each group being electrically connected, and a plurality of rigidly associated movable contact members connected in pairs and neutrally disposed between said groups and adapted to be moved in either direction into coöperative engagement with two sections of each adjacent group of stationary contact terminals, operation on opposite sides of the neutral position effecting opposite directions of motor rotation.

9. In a control system, the combination with an electric motor, a plurality of sections of resistance and a plurality of sets of stationary contact terminals disposed in an arc of a circle, each set being divided into a braking and a motor operating section of terminals, of a plurality of movable contact members neutrally disposed between alternate pairs of said sets and adapted to be moved in either direction into coöperative engagement with adjacently located sets of contact terminals, whereby engagement with said braking sections effects dynamic braking of said motor, if said motor is in operation, but is ineffective if said motor is at rest, while engagement with said motor operating sections effects speed controlling motor connections.

10. A controller comprising eight groups of stationary contact terminals disposed in arcs of a circle, six sections of resistance connected thereto and four rigidly associated movable contact members neutrally disposed between alternate groups of contact terminals and adapted to be moved in either direction into engagement with the adjacently located groups of contact terminals.

11. A controller comprising a plurality of groups of stationary contact terminals circularly disposed, a plurality of movable coöperating contact members rigidly associated and connected in pairs, said movable contact members being neutrally located between said groups and adapted to be moved in either direction, a plurality of resistance sections connected in circuit when said movable contact members are moved in one direction, independent resistance sections for movement in the opposite direction and additional resistance sections for both directions of movement.

12. In a system of control, an electric motor, a plurality of alternately arranged motor braking and motor accelerating groups of circularly disposed stationary contact terminals, a plurality of rigidly associated movable contact members neutrally disposed between alternate pairs of groups of stationary contact terminals and adapted to coöperate with the adjacent groups of contact terminals, a plurality of resistance sections adapted to be connected in circuit when said movable contact members engage adjacent groups of contact terminals on one side of a neutral position, independent resistance sections adapted to be connected when engagement with the adjacent groups on the other side of the neutral position is effected, and a plurality of resistance sections adapted to be connected when engagement with either adjacent groups is effected, the arrangement of connections being such that speed controlling motor connections are established by engagement of said contact members with said groups of contact terminals on one side of the neutral position, and a reversing connection for the motor and regulating dynamic braking connections are effected by coöperative engagement of said contact members with said groups of contact terminals, on the opposite side of the neutral position.

13. In a system of control, an electric motor, eight groups of circumferentially arranged stationary contact terminals, four neutrally located rigidly associated movable contact members to coöperate therewith, and six resistance sections connected to said groups of contact terminals, the arrangement of connections being such that movement of said contact members away from the neutral position in one direction establishes operative motor connections and successively eliminates said resistance, and movement toward the neutral position successively inserts said resistance, while movement away from the neutral position in the opposite direction establishes operative reverse motor connections on the last contact terminal, and movement toward the neutral position establishes a local dynamic braking circuit and successively eliminates said resistance from circuit.

In testimony whereof, I have hereunto subscribed my name this 20th day of Sept., 1910.

HENRY D. JAMES.

Witnesses:
GEORGE J. SCHMIDT,
B. B. HINES.